US007316627B2

(12) United States Patent
Bennett

(10) Patent No.: US 7,316,627 B2
(45) Date of Patent: Jan. 8, 2008

(54) INTEGRATED TWO-SPEED MOTOR

(75) Inventor: John L. Bennett, Fraser, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 209 days.

(21) Appl. No.: 11/198,204

(22) Filed: Aug. 5, 2005

(65) Prior Publication Data

US 2006/0046887 A1 Mar. 2, 2006

Related U.S. Application Data

(60) Provisional application No. 60/605,094, filed on Aug. 27, 2004.

(51) Int. Cl.
*F16H 48/06* (2006.01)
(52) U.S. Cl. ...................... 475/149; 475/314
(58) Field of Classification Search ............... 475/306, 475/308, 309, 310, 10
See application file for complete search history.

(56) References Cited

U.S. PATENT DOCUMENTS

| | | | | |
|---|---|---|---|---|
| 3,080,774 A | * | 3/1963 | Nickerson et al. ......... | 475/143 |
| 4,467,230 A | * | 8/1984 | Rovinsky ................... | 310/83 |
| 5,285,111 A | * | 2/1994 | Sherman ................... | 290/4 C |
| 5,482,512 A | * | 1/1996 | Stevenson ................. | 475/5 |
| 5,759,128 A | * | 6/1998 | Mizutani et al. .......... | 475/149 |
| 6,555,941 B1 | * | 4/2003 | Zepp et al. ................ | 310/191 |
| 6,727,614 B2 | * | 4/2004 | Neubauer et al. ......... | 310/75 R |
| 7,207,915 B2 | * | 4/2007 | Oshidari et al. ........... | 475/5 |

* cited by examiner

*Primary Examiner*—Ha Ho
*Assistant Examiner*—Edwin A Young
(74) *Attorney, Agent, or Firm*—Carlson, Gaskey & Olds

(57) ABSTRACT

A vehicle drive assembly includes an integrated two-speed motor that can selectively drive an output at a high operating speed or a low operating speed. The two-speed motor includes a stator mounted to a non-rotating outer housing, and a rotor that is mounted for rotation relative to the stator. The rotor is supported an inner rotor support that defines an inner cavity. A two-speed shifting mechanism is incorporated into the inner cavity and is used to drive an output. The two-speed shifting mechanism includes a gear assembly and first and second clutch assemblies that cooperate with each other to provide low and high speed output capability as needed.

16 Claims, 2 Drawing Sheets

INTEGRATED TWO-SPEED MOTOR

RELATED APPLICATION

This application claims priority to U.S. Provisional Application No. 60/605,094, which was filed on Aug. 27, 2004.

TECHNICAL FIELD

This invention generally relates to an electric motor vehicle drive with an integrated two-speed shifter.

BACKGROUND OF THE INVENTION

Many hybrid electric applications operate more effectively with a two-speed transmission. This capability is certainly beneficial to hybrid electric applications such as transit buses and military vehicles, which require a wide range of operational speeds. In these applications, electric motors are used to provide driving input to a drive axle or gear box that ultimately drives the vehicle.

In the example of a transit bus, an electric motor can power a drive axle extending between a pair of vehicle wheels. The drive axle typically includes a carrier that houses a differential gear assembly, which allows speed differentiation between laterally opposed wheels as the bus negotiates a turning maneuver.

In the example of a military vehicle, such as a tracked vehicle for example, the electric motor can power a gear box, or a series of gear boxes, to power a final drive associated with laterally spaced tracks located at sides of the tracked vehicle. The electric motor could also be used in combination with the gear boxes to steer the tracked vehicle. Traditionally, a series of electric motors are required to accomplish both driving and steering functions.

Typically, the electric motors are coupled to drive existing gear box and drive axle configurations. To achieve lower speed outputs from high speed motors, additional gear boxes or transmissions may also be required. Additional gear boxes are not desirable because the gear boxes occupy valuable packaging space that is needed for other vehicle components.

For the above reasons, it would be desirable provide a more compact electric motor drive that incorporates two-speed capability, with driving output, without requiring a proliferation of gear boxes. The electric motor drive should be robust and easy to assemble in addition to overcoming other deficiencies in the prior art as outlined above.

SUMMARY OF THE INVENTION

An integrated two-speed motor is used to drive an output for a vehicle drive. The two-speed motor includes a shifting mechanism that can selectively drive the output at a high operating speed or a low operating speed. The two-speed motor includes a stator mounted to a non-rotating outer housing, and a rotor that is mounted for rotation relative to the stator. The rotor is supported on an inner rotor support that defines an inner cavity. The shifting mechanism is incorporated into the inner cavity and includes a gear assembly and first and second clutch assemblies that cooperate with each other to provide low and high speed output capability as needed.

The gear assembly includes a first gear, a second gear, and a plurality of pinion gears that are supported on a spider. The spider is fixed for rotation with an output shaft and each pinion gear is in meshing engagement with the first and second gears. A gear housing is positioned within the inner cavity and substantially surrounds the first gear, second gear, and plurality of pinion gears. The first clutch assembly selectively couples the first gear to the gear housing to provide high-speed output capability and the second clutch assembly selectively couples the second gear to ground, i.e. non-rotating outer housing, to provide low-speed output capability.

The subject invention provides an electric motor and two-speed shifting mechanism for a vehicle drive that is incorporated within a common housing, which saves packaging space, reduces overall weight, and allows the electric motor and the two-speed shifting mechanism to share a common cooling system.

These and other features of the present invention can be best understood from the following specification and drawings, the following of which is a brief description.

DETAILED DESCRIPTION OF THE PREFERRED EMBODIMENT

Figure 1:
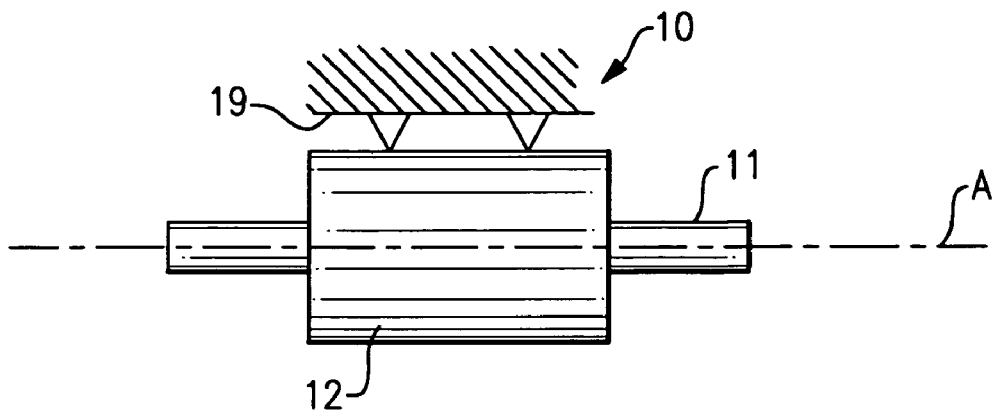
FIG. 1 is a schematic view of a vehicle drive incorporating the subject invention.
Figure 2:
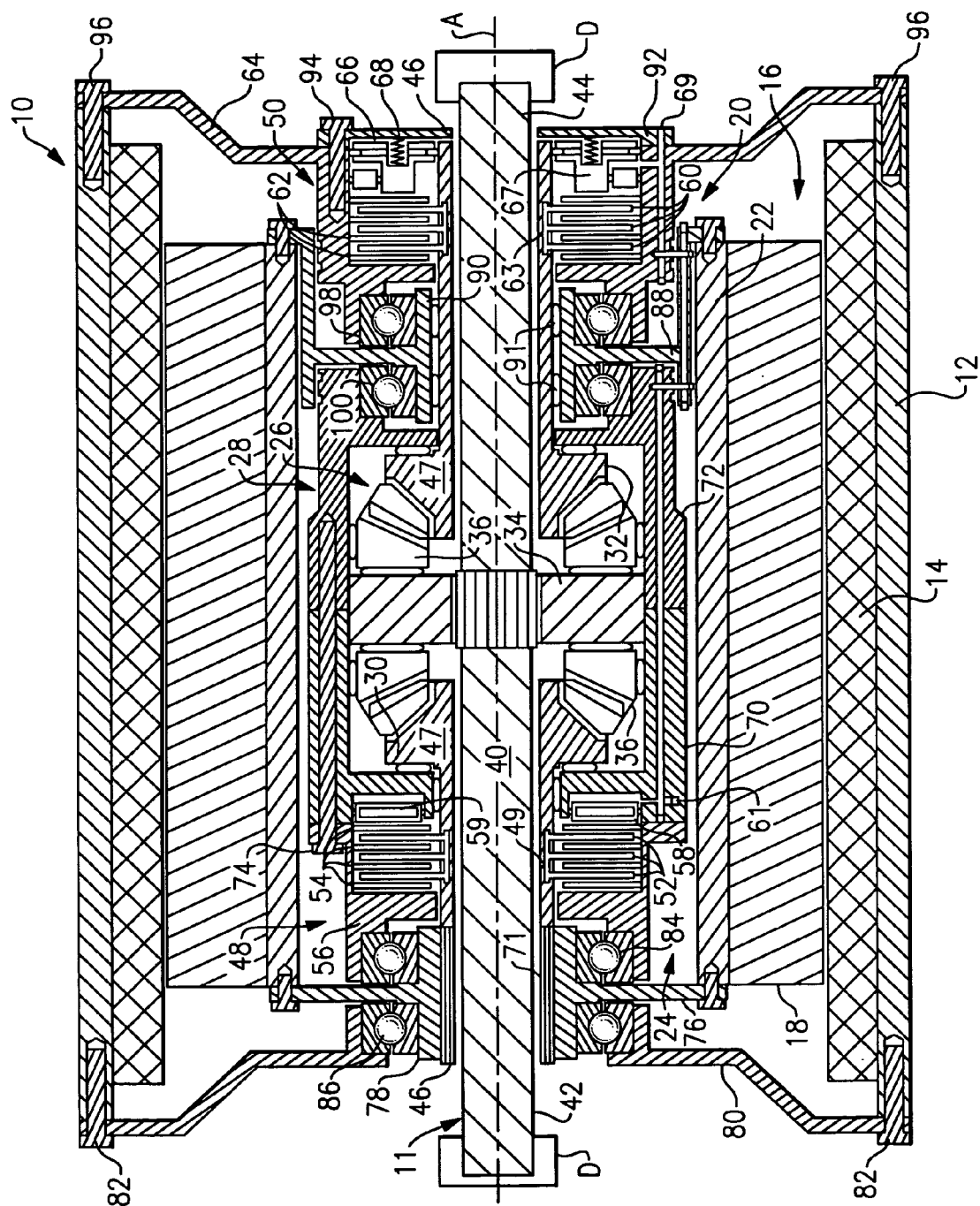
FIG. 2 is a cross-sectional view of a drive motor incorporating the subject invention.

An electric motor 10, shown in FIG. 1, is used in a vehicle application to drive an output 11. The electric motor 10 includes an outer housing 12 that supports a stator 14 as shown in FIG. 2. The stator 14 defines an inner cavity 16 that receives a rotor 18. The rotor 18 is spaced apart from the stator 14 and is mounted for rotation relative to the stator 14 about an axis A. The stator 14 and outer housing 12 are non-rotating components that are supported by vehicle structures, such as a vehicle frame or chassis 19, for example.

A two-speed shifting mechanism, shown generally at 20 in FIG. 2, is incorporated into the rotor 18. The rotor 18 is supported on an inner rotor support 22 that defines an inner cavity 24. The two-speed shifting mechanism 20 is positioned within the inner cavity 24. The two-speed shifting mechanism 20 includes a gear assembly 26 positioned within a gear housing 28 formed from multiple housing components. Because the two-speed shifting mechanism 20 is incorporated inside the rotor 18 of the electric motor 10, the electric motor 10 and two-speed shifting mechanism 20 can share a common cooling system (not shown). Any type of cooling system could be utilized.

The gear assembly 26 includes a first side gear 30, a second side gear 32, and a spider 34 that supports a plurality of pinion gears 36. The pinion gears 36 are in meshing engagement with the first 30 and second 32 side gears. The spider 34 is similar to a differential spider that is used in a traditional drive axle differential gear assembly. In this traditional configuration, the differential spider has four (4) legs with each leg supporting one pinion gear. The spider 34 shown in FIG. 2 is similarly configured, i.e. has four (4) legs and four (4) pinion gears 36, however only two (2) pinion gears 36 are shown.

Figure 3:
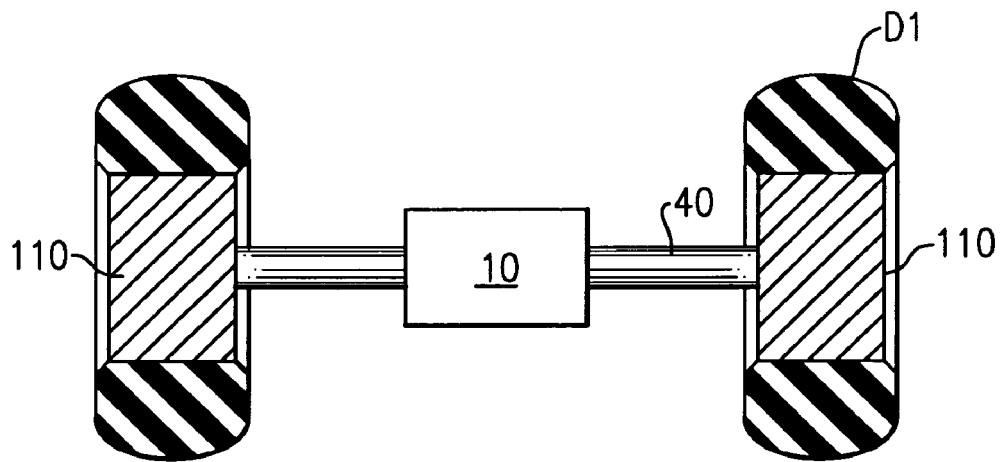
FIG. 3 is a schematic view of one embodiment of an output driven by the drive motor.
Figure 4:
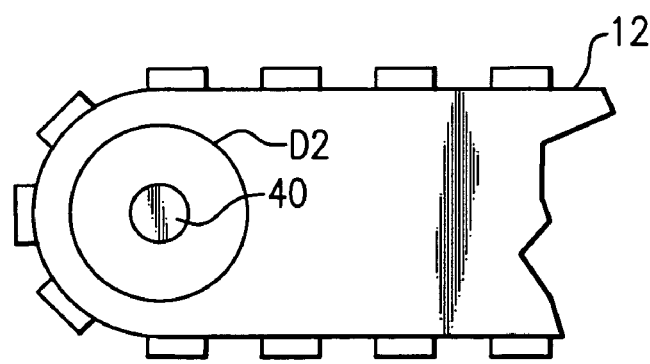
FIG. 4 is a schematic view of another embodiment of an output driven by the drive motor.

The spider 34 is splined directly to the output 11. In the example shown, the output 11 comprises an output shaft 40 having a splined portion 41 that is coupled to a center portion of the spider 34. The output shaft 40 has a first end 42 for providing a first driving output and a second end 44 for providing a second driving output. The output shaft 40 extends through hollow gear shaft bodies 46 that form the first 30 and second 32 side gears. The first and second driving outputs can be used to operate any type of vehicle drive, shown schematically at D. The vehicle drive D can be a vehicle wheel D1 as shown in FIG. 3 or can be a final drive D2 for a tracked vehicle as shown in FIG. 4, for example.

The two-speed shifting mechanism 20 includes a first clutch 48 that selectively couples the first side gear 30 to the gear housing 28 to provide a high-speed output capability and a second clutch 50 that selectively couples the second side gear 32 to ground to provide a low-speed output capability. In a typical driving mode, only one of the first 48 or second 50 clutches will be engaged at a time, however, the other of the first 48 and second 50 clutches can be selectively engaged to provide braking as needed. Further, both the first 48 and second 50 clutches can be disengaged at the same time to provide a neutral or free-wheeling mode of operation.

The first clutch 48 includes a first plurality of discs 52 that are mounted for rotation with the first side gear 30 and a second plurality of discs 54 that are mounted to a first clutch housing 56. The first side gear 30 includes the hollow gear shaft body 46 with a gear head 47 formed on one end. The hollow gear shaft body 46 includes a first splined portion 49 formed about an outer circumference that provides a mounting interface for the first plurality of discs 52.

A first clutch actuator 58 compresses the first 52 and second 54 pluralities of discs together to engage the first clutch 48. In the example shown, the first clutch actuator 58 comprises a piston 59 that is actuated via a fluid connection 61, however, any type of clutch actuator could be used for the first clutch actuator 58. The first 52 and second 54 pluralities of discs slide relative to the first side gear 30 and the first clutch housing 56 to achieve engagement. When engaged, the first side gear 30 and gear housing 28 are fixed for rotation together about axis A to drive the output shaft 40 via the spider 34.

The second clutch 50 includes a third plurality of discs 60 that are mounted for rotation with the second side gear 32 and a fourth plurality of discs 62 that are mounted to a second clutch housing 64. The second clutch housing 64 is fixed to the outer housing 12. The second side gear 32 includes the hollow gear shaft body 46 with a gear head 47 formed on one end. The hollow gear shaft body 46 includes a splined portion 63 formed about an outer circumference that provides a mounting interface for the third plurality of discs 60.

A second clutch actuator 66 compresses the third 60 and fourth 62 pluralities of discs together to engage the second clutch 50. Any type of clutch actuator known in the art could be used for the second clutch actuator 66. In the example shown, the second clutch actuator 66 comprises a piston 67 that is actuated via a fluid connection 69. The third 60 and fourth 62 pluralities of discs slide relative to the second side gear 32 and the second clutch housing 64 to achieve engagement. When engaged, the second side gear 32 is grounded to a non-rotating component, i.e. the outer housing 12 via the second clutch housing 64. The pinion gears 36 roll around the fixed second side gear 32 resulting in a low range gear option.

The first 58 and second 66 clutch actuators can be the same type of actuator or can be different actuators. In the example shown in FIG. 2, air or hydraulic pressure is used to control the first 58 and second 66 clutch actuators via the fluid connections 61, 69, respectively. Further, in the example shown, the second clutch actuator 66 also includes a biasing feature 68 that defaults into low speed without requiring air or hydraulic pressure. The biasing feature 68 could comprise a spring that reacts between the piston 67 and a fixed portion of the outer housing 12.

As discussed above, the gear housing 28 is preferably formed from multiple housing pieces. In the example shown, the gear housing 28 includes a first housing piece 70 generally surrounding the first side gear 30 and a second housing piece 72 generally surrounding the second side gear 32. The first 70 and second 72 housing pieces are attached together with a plurality of fasteners 74 (only one is shown), however, other attachment methods could also be used.

The first clutch housing 56 is fastened to the first housing piece 70 with the same fasteners 74. A first bearing cage 76 is mounted to one end of the inner rotor support 22 adjacent the first clutch 48. The first bearing cage 76 includes a center portion 78 that is mounted to the second splined portion 71 of the hollow gear shaft body 46 of the first side gear 30. A first end piece cover 80 is mounted to the outer housing 12 with fasteners 82 to enclose the first clutch 48 within the inner cavity 16. While fasteners 82 are preferred, it should be understood that other attachment methods could also be used.

A first bearing set 84 is positioned between the center portion 78 of the first bearing cage 76 and the first clutch housing 56. A second bearing set 86 is positioned between the center portion 78 of the first bearing cage 76 and the first end piece cover 80.

A second bearing cage 88 is mounted to an opposite end of the inner rotor support 22 adjacent the second clutch 50. The second bearing cage 88 includes a center portion 90 that is supported on the hollow gear shaft body 46 of the second side gear 32 via bushings 91. A second end piece cover 92 is mounted to the second clutch housing 64 with fasteners 94 (only one is shown) to enclose the second clutch 50 within the inner cavity 16. The second clutch housing 64 includes a flanged portion that is attached to the outer housing 12 with fasteners 96. While fasteners 94, 96 are preferred, it should be understood that other attachment methods could also be used.

A third bearing set 98 is positioned between the center portion 90 of the second bearing cage 88 and the second clutch housing 64. A fourth bearing set 100 is positioned between the center portion 90 of the second bearing cage 88 and the second housing piece 72.

Rotor alignment and support is achieved by attaching the first 76 and second 88 bearing cages to opposing ends of the inner rotor support 22. Both the first 76 and second 88 bearing cages are then supported by the second bearing set 86 and the third bearing set 98 to ground. The gear housing 28 is also supported by the same first 76 and second 88 bearing cages through the first 84 and fourth 100 bearing sets.

When the first clutch 48 is engaged, the first side gear 30 is coupled to the gear housing 28 causing the first 30 and second 32 side gears to rotate together to provide a high range gear option in a 1:1 ratio. The first 30 and second 32 side gears drive the pinion gears 36, which drive the spider 34. The spider 34 drives the output shaft 40.

When the second clutch 50 is engaged, the second side gear 32 is locked to ground, i.e. the second side gear 32 is locked to the outer housing 12. In this configuration, the second side gear 32 is prevented from rotating and the pinion gears 36 roll around the fixed second side gear 32 resulting in a low range gear option. In a configuration where the first 30 and second 32 side gears have the same diameter, a 2:1 reduction is provided, which means that the pinion gears 36 drive the spider 34 at half of the speed from the high range gear option.

The electric motor 10 can be used to drive a drive axle for a vehicle having laterally opposed vehicle wheels 110 as shown in FIG. 3. Optionally, the electric motor 10 can be used to provide power and/or steering for a tracked vehicle 112 as shown in FIG. 4. The subject invention provides an integrated two-speed shifting mechanism in the center of a rotor, which saves packaging space, reduces overall weight, and allows the electric motor and the shifting mechanism to share a common cooling system.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An electric motor comprising:
a stator;
a rotor mounted for rotation relative to said stator;
an output operably driven by said rotor; and
a two-speed shifting mechanism incorporated into said rotor for providing said output with at least a high-speed and a low-speed output capability, and wherein said two-speed shifting mechanism includes a gear assembly having a gear housing supported by said rotor and enclosing said two-speed shifting mechanism, a first clutch that selectively couples said gear assembly to said gear housing to provide the high-speed output capability, and a second clutch that selectively couples said gear assembly to a ground to provide the low-speed output capability.

2. The electric motor according to claim 1 wherein said output is adapted to drive a final drive for a tracked vehicle.

3. The electric motor according to claim 1 wherein said output is adapted to drive a vehicle wheel assembly.

4. The electric motor according to claim 1 wherein said gear assembly includes a first side gear associated with said first clutch, a second side gear associated with said second clutch, and a spider supporting a plurality of pinion gears that are in meshing engagement with said first and second side gears.

5. The electric motor according to claim 4 wherein said output comprises a drive shaft splined to said spider.

6. The electric motor according to claim 1 wherein only one of said first and second clutches is engaged at a time.

7. The electric motor according to claim 1 wherein one of said first and second clutches is engaged to drive said output and another of said first and second clutches is selectively and simultaneously engaged to provide braking.

8. The electric motor according to claim 1 wherein both of said first and second clutches are disengaged to provide a neutral mode of operation.

9. The electric motor according to claim 1 wherein said rotor includes an inner rotor support defining an inner rotor cavity, said two-speed shifting mechanism being attached to said inner rotor support.

10. The electric motor according to claim 9 wherein said gear housing is fixed to said inner rotor support.

11. A vehicle drive assembly comprising:
a stator;
a rotor mounted for rotation relative to said stator, said rotor defining a hollow inner cavity;
an output operably driven by said rotor about an axis of rotation; and
a two-speed shifting mechanism incorporated into said hollow inner cavity of said rotor for providing said output with at least a high-speed and a low-speed output capability, said two-speed shifting mechanism including a gear housing substantially enclosing a gear assembly coupled to said output wherein said gear assembly includes a first gear that is selectively coupled to said gear housing to provide the high-speed output capability, a second gear that is selectively coupled to a non-rotating member to provide the low-speed capability, and a plurality of pinion gears supported on a spider wherein each pinion gear is in meshing engagement with said first and second gears.

12. The vehicle drive assembly according to claim 1 including a first clutch mounted within a first clutch housing for coupling said first gear to said gear housing and a second clutch mounted within a second clutch housing for coupling said second gear to said non-rotating member wherein said first clutch housing is mounted to said gear housing and said second clutch housing is mounted a stator housing that comprises said non-rotating member.

13. The vehicle drive assembly according to claim 12 including an inner rotor support supporting an inner circumference of said rotor, a first bearing cage attached to said first gear and a first end of said inner rotor support, and a second bearing cage attached to a second end of said inner rotor support wherein said first bearing cage supports a first bearing set positioned between said stator housing and said first bearing cage and a second bearing set positioned between said first clutch housing and said first bearing cage and wherein said second bearing cage supports a third bearing set positioned between said gear housing and said second bearing cage and a fourth bearing set positioned between said second clutch housing and said second bearing cage.

14. The vehicle drive assembly according to claim according to claim 13 wherein said gear housing includes a first gear housing portion attached to said first clutch housing and a second gear housing portion supported within said second bearing cage.

15. The vehicle drive assembly according to claim according to claim 11 wherein said output comprises a shaft that is fixed for rotation with said spider.

16. A method of assembling a vehicle drive assembly comprising the steps of:
fixing a stator within a non-rotating outer housing;
supporting a rotor within a stator inner cavity on an inner rotor support defining an inner rotor cavity including aligning the rotor within the stator inner cavity by attaching a first bearing cage to a first end of the inner rotor support and attaching a second bearing cage to a second end of the inner rotor support opposite the first end;
installing a two-speed shifting mechanism within the inner rotor cavity for providing at least a high-speed and a low-speed output capability wherein the two-speed shifting mechanism includes a gear assembly housed within a gear housing and having a first gear selectively coupled to the gear housing with a first clutch assembly to provide the high speed output capability and a second gear selectively coupled to the non-rotating outer housing with a second clutch assembly to provide the low-speed output capability and including installing a first bearing between the first bearing cage and the non-rotating outer housing to rotatably support the first gear during low-speed output, installing a second bearing between the first bearing cage and a clutch housing of the first clutch assembly to rotatably support the first gear during high-speed output, installing a third bearing between the second bearing cage and the gear housing to rotatably support the second gear during high-speed output, and installing a fourth bearing between the second bearing cage and a clutch housing of the second clutch assembly to rotatably support the second gear during low-speed output; and coupling an output to the rotor via the two-speed shifting mechanism.

* * * * *

UNITED STATES PATENT AND TRADEMARK OFFICE
CERTIFICATE OF CORRECTION

PATENT NO.       : 7,316,627 B2                                    Page 1 of 1
APPLICATION NO. : 11/198204
DATED            : January 8, 2008
INVENTOR(S)     : Bennett It is certified that error appears in the above-identified patent and that said Letters Patent is hereby corrected as shown below:

Column 6, line 16: "1" should read as --11--

Column 6, line 22: Insert --to-- between "mounted" and "a"

Signed and Sealed this

Twentieth Day of May, 2008

JON W. DUDAS
*Director of the United States Patent and Trademark Office*